(12) United States Patent
Matsumoto

(10) Patent No.: US 7,310,095 B2
(45) Date of Patent: Dec. 18, 2007

(54) METHOD, COMPUTER PROGRAM PRODUCT, AND DEVICE FOR PROJECTING AN EXFOLIATED PICTURE

(75) Inventor: Kazuhiko Matsumoto, Tokyo (JP)

(73) Assignee: Ziosoft Inc., Tokyo (JP)

( * ) Notice: Subject to any disclaimer, the term of this patent is extended or adjusted under 35 U.S.C. 154(b) by 361 days.

(21) Appl. No.: 10/990,600

(22) Filed: Nov. 17, 2004

(65) Prior Publication Data

US 2006/0002626 A1 Jan. 5, 2006

(30) Foreign Application Priority Data

Jul. 1, 2004 (JP) ............... 2004-196040

(51) Int. Cl.
*G06T 15/00* (2006.01)
(52) U.S. Cl. ..................... 345/419; 345/427
(58) Field of Classification Search ............. None
See application file for complete search history.

(56) References Cited

U.S. PATENT DOCUMENTS

| | | | |
|---|---|---|---|
| 5,963,211 A * | 10/1999 | Oikawa et al. | 345/424 |
| 6,014,143 A * | 1/2000 | Naqvi et al. | 345/424 |
| 6,456,735 B1 | 9/2002 | Sato et al. | |
| 6,947,039 B2 * | 9/2005 | Gerritsen et al. | 345/419 |
| 2002/0190980 A1 * | 12/2002 | Gerritsen et al. | 345/419 |
| 2004/0113888 A1 * | 6/2004 | De Waal | 345/157 |

FOREIGN PATENT DOCUMENTS

JP 2000-48168 2/2000

OTHER PUBLICATIONS

Article "Interactive Exploration of Extra and Intracranial Blood Vessels", by Dirk Bartz et al., IEEE Visualization conference proceedings, 1999.*
Article "Translucent and Opaque Direct Volume Rendering for Virtual Endoscopy Applications" by Michael Meissner et al., Proc. of Volume Graphics, 2001.*
Article "An interactive Virtual Endoscopy Tool" by D. Nain et. al., IMIVA workshop, MICCAI Oct. 2001, pp. 1-6.*
Anna Vilanova Bartroli et al., "Virtual Colon Unfolding," Institute of Computer Graphics and Algorithms, Vienna University of Technology, 2001, (pp. 411-420).

* cited by examiner

*Primary Examiner*—Mark Zimmerman
*Assistant Examiner*—Enrique L. Santiago
(74) *Attorney, Agent, or Firm*—Patterson, Thuente, Skaar & Christensen, P.A.

(57) ABSTRACT

A method for projecting an exfoliated picture by outputting direction information of image data having three or more dimensions. The method includes calculating direction information of each voxel using voxel data of a plurality of pixels, and generating the exfoliated picture with the direction information.

39 Claims, 13 Drawing Sheets

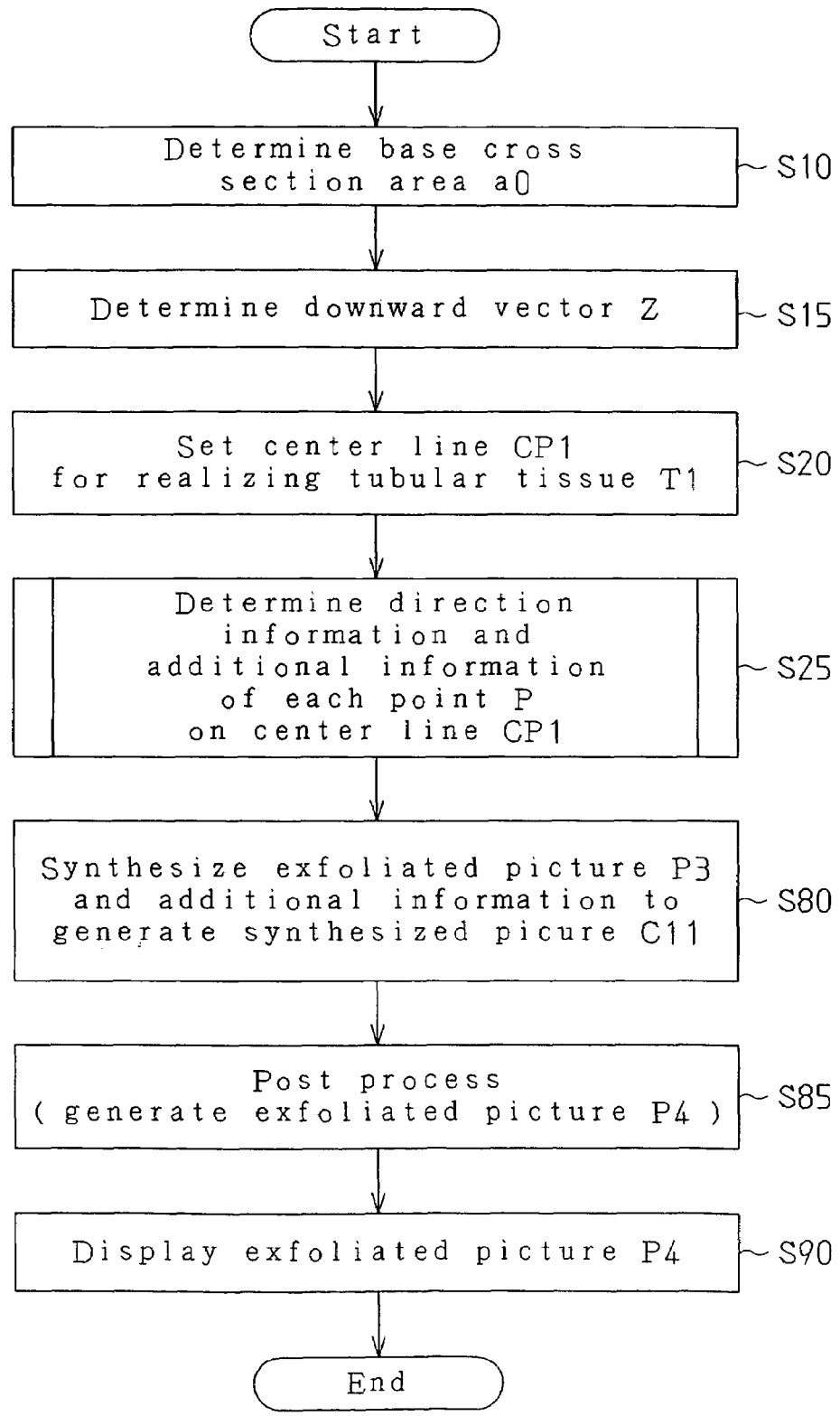

METHOD, COMPUTER PROGRAM PRODUCT, AND DEVICE FOR PROJECTING AN EXFOLIATED PICTURE

BACKGROUND OF THE INVENTION

The present invention relates to a method, a computer program product, and a device for projecting an exfoliated picture, and more specifically, to a method, a computer program product, and a device for projecting an exfoliated picture of tubular tissues.

Conventionally, medical image information relating to internal organs created by diagnostic medical imaging devices, such as diagnostic x-ray devices, computer tomography (CT) x-ray devices, magnetic resonance imaging devices (MRI devices), and the like, are used in performing medical procedures such as medical diagnostics and treatment. Medical image information is processed to obtain an image which can be displayed three-dimensionally, and the image is viewed three-dimensionally for the purpose of diagnosis or treatment. For example, there are three-dimensional display methods as described below for displaying images of tubular organs among organs such as blood vessels, the trachea, and digestive tract.

One such method is the parallel projective method which externally renders a tubular organ with parallel rays, and projects the tubular organ onto a two-dimensional plane. As shown in FIG. 1, a parallel projection image P1 created by the parallel projective method is suited for viewing a tubular organ from the outside. However, the user cannot view the interior of the tubular organ in the parallel projection image P1. The perspective projective method, for example, can be used for viewing the interior of a tubular organ. In the perspective projective method, an image of the interior of a tubular organ, rendered by light rays radially radiated from a viewpoint set within the tubular organ, is projected onto a two-dimensional plane. The perspective projective image P2 shown in FIG. 2, for example, can be created by the perspective projective method. The perspective projective image P2 can be used as a virtual endoscope so as to display an image of the interior side of tubular organs just as if viewed through an endoscope. A user can view the inside of the tubular organ using the perspective projective image P2. However, when a user does not closely examine the entirety of the interior circumference of the tubular organ, there is concern a polyp or the like may be overlooked. Furthermore, it is difficult to see the back side of folds present in tubular organs in the perspective projective image P2.

An article by Vilanova Bartroli et al., "Virtual Colon Unfolding," appearing in the United States publication, IEEE Visualization (2001, p. 411-420), describes an exfoliated picture display in which a tubular organ is projected onto a cylindrical projection surface virtually disposed around a tubular organ by the cylindrical projection method or the curvature cylindrical projection method. The projection image is sliced from the side of the cylindrical surface so as to be unfolded on a two-dimensional surface. An exfoliated picture P3, such as that shown in FIG. 3, is created by the exfoliated picture display. In the exfoliated picture P3, polyps and the like can be readily discovered since the inner wall surface of the tubular organ can be viewed on a two-dimensional surface.

In the exfoliated picture P3, however, it is difficult to understand the observation position and observation direction. Tubular organs are sometimes twisted, or the direction in which the tubular organ extends sometimes changes. Accordingly, for example, the region which corresponds to the lower part of the tubular organ moves on the exfoliated picture P3 even when the image of the tubular organ is unfolded so as to position the bottom part at the proximal portion of the tubular organ in the center in the exfoliated picture P3. That is, in the exfoliated picture P3, the user can comprehend the relative position of the inner wall surface of the tubular organ, but cannot comprehend the absolute position (coordinates) of the inner wall position of the tubular organ. It is therefore difficult to recognize where in the tubular organ the observation position is located in the exfoliated picture P3. Further, it is difficult to avoid re-examining an already examined location in the exfoliated picture P3. It is also difficult to determine the observation direction in the exfoliated picture P3.

Among tubular organs, rinsing (internal residue) of the interior of the intestines may be present. Rinsing may accumulate in the lower side of intestines during a CT scan to create an exfoliated picture P3. Users often mistake rinsing represented in the exfoliated-picture P3 as polyps.

SUMMARY OF THE INVENTION

The present invention provides a method, computer program product, and device for outputting direction information of three-dimensional image data, and projecting an exfoliated picture.

One aspect of the present invention is a method for generating an exfoliated picture projected on a projection plane using image data rendered on a three-dimensional hypothetical surface. The image data includes a plurality of pixels, each having position data. The method includes calculating direction information of each of the pixels using the position data of the pixels, and generating the exfoliated picture with the direction information.

Another aspect of the present invention is a method for generating an exfoliated picture of image data rendered on a three-dimensional hypothetical surface with a hypothetical line defined in the image data. The image data includes a plurality of pixels, at least some of which form the exfoliated picture. The method includes temporarily generating the exfoliated picture by unfolding the three-dimensional hypothetical surface, setting a specific direction for the image data, calculating direction information representing direction or position in the exfoliated picture of the at least some pixels based on the specific direction and the direction in which the hypothetical line extends, and generating a new exfoliated picture by synthesizing the exfoliated picture and the direction information.

A further aspect of the present invention is a computer program product comprising a computer-readable medium encoded with a program for generating an exfoliated picture projected on a projection plane with image data rendered on a three-dimensional hypothetical surface. The image data includes a plurality of pixels, each having position data, the program when executed by at least one computer performing steps including calculating direction information of each of the pixels using the position data of the pixels, and generating the exfoliated picture with the direction information.

Another aspect of the present invention is a computer program product comprising a computer-readable medium encoded with a program for generating an exfoliated picture of image data rendered on a three-dimensional hypothetical surface with a hypothetical line defined in the image data. The image data include a plurality of pixels, at least some of which form the exfoliated picture. The program when executed by at least one computer performing steps including temporarily generating the exfoliated picture by unfolding the three-dimensional hypothetical surface, setting a specific direction for the image data, calculating direction information representing direction or position in the exfoliated picture of the at least some pixels based on the specific direction and the direction in which the hypothetical line extends, and generating a new exfoliated picture by synthesizing the exfoliated picture and the direction information.

A further aspect of the present invention is a device for generating an exfoliated picture projected on a projection plane using image data rendered on a three-dimensional hypothetical surface. The image data includes a plurality of pixels, each having position data. The device includes a direction information calculating means for calculating direction information of each of the pixels using the image data of the pixels, and a generating means for generating the exfoliated picture with the direction information.

Another aspect of the present invention is a device for generating an exfoliated picture projected on a projection plane using image data rendered on a three-dimensional hypothetical surface. The image data includes a plurality of pixels, each having position data. The device includes a computer storing a program that when executed by the computer calculates direction information of each pixel using the position data of the pixels and generates the exfoliated picture with the direction information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a flowchart of the exfoliated picture projection process;

DETAILED DESCRIPTION OF THE PREFERRED EMBODIMENTS

Figure 1:
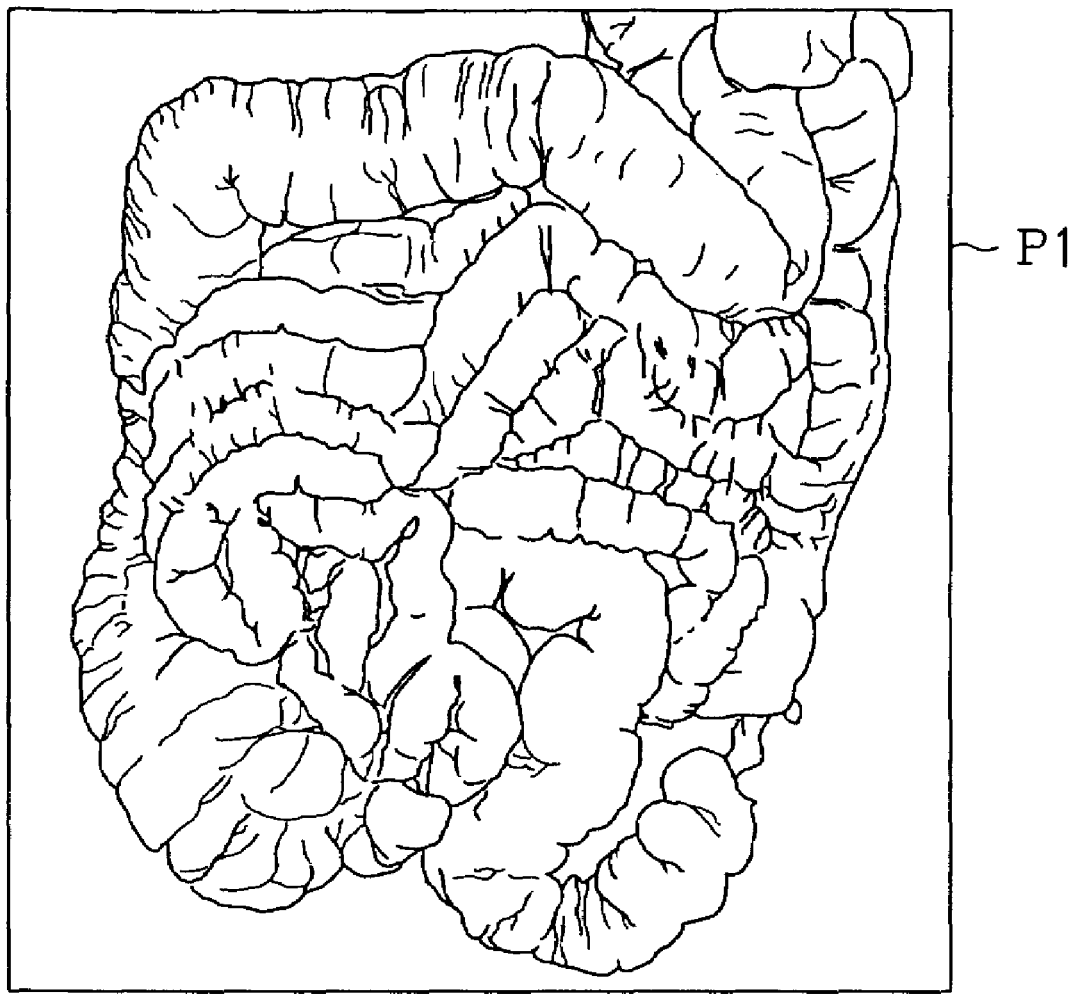
FIG. 1 is a schematic view illustrating a projection image of a tubular organ created by the parallel projective method.
Figure 2:
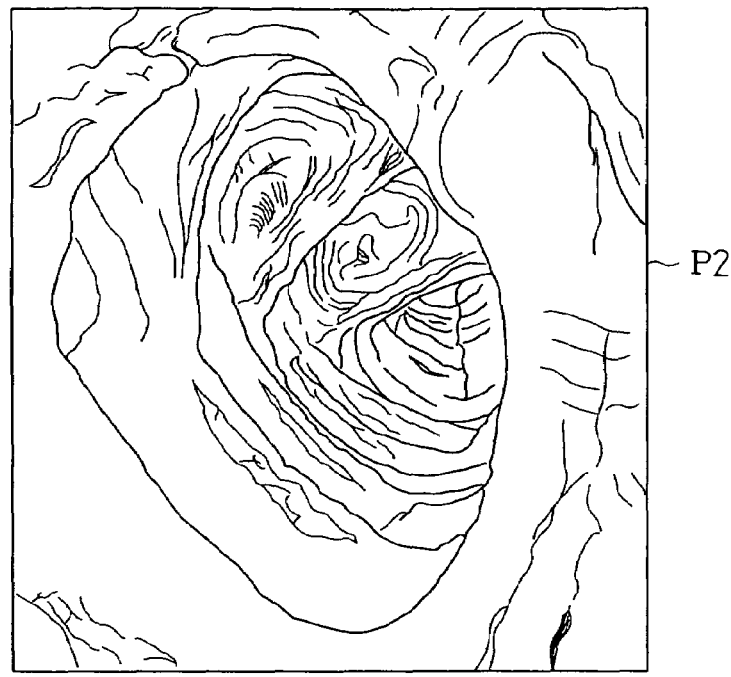
FIG. 2 is a schematic diagram illustrating a projection image of a tubular organ created by the perspective projective method.

In the drawings, like numerals are used for like elements throughout.

First Embodiment

An image display device 1 according to a first embodiment of the present invention is described hereinafter with reference to FIGS. 4 through 14.

Figure 4:
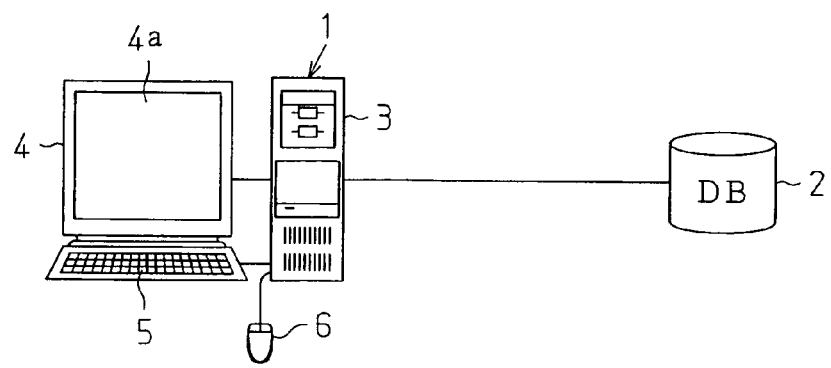
FIG. 4 is a schematic diagram of an image display device according to a first embodiment of the present invention.

As shown in FIG. 4, the image display device 1 is connected to a database 2. The database 2 stores, for example, CT image data acquired by a computerized tomography (CT) image projection device. The image display device 1 reads CT image data from the database 2, generates various types of images used for diagnosis and treatment, and displays these images on a screen. Although the image display device 1 of the first embodiment uses CT image data, the image data used by the image display device is not limited to CT image data. Usable image data includes data obtained by medical image processing devices such as CT and magnetic resonance imaging (MRI). Furthermore, data which combines such data, or data generated by processing such data also may be used.

The image display device 1 is provided with a computer 3 (workstation or personal computer), monitor 4, and input devices such as a keyboard 5 and a mouse 6. The computer 3 is connected to the database 2.

FIG. 4 schematically shows the structure of the image display device 1. The computer 3 includes a central processing unit (CPU) 7 and a memory 8 provided with a hard disk. The image display device 1 reads CT image data from the database 2 or the hard disk, and acquires voxel data from the CT image data. The memory 8 stores a program 9 (application software) for executing an exfoliated picture projection process. The memory 8 is provided with a memory unit 8a for temporarily storing the voxel data acquired from the CT image data. The memory 8a stores a center line CP, a downward vector z, a direction vector h, a base cross-sectional area a0, and an interior region area a. Furthermore, the memory 8 is provided with an exfoliated picture storage unit UF for storing the exfoliated picture of tubular organs, and a direction information storage unit DI for storing direction information and additional information.

The CPU 7 calculates direction information and additional information of an exfoliated picture of a tubular organ by executing the program 9 using the voxel data obtained from the CT image data of the database 2 (exfoliated picture projection process). That is, in the first embodiment, the CPU 7 (of computer 3) executes the exfoliated picture projection process program of exfoliated picture projection process (direction information calculation stage, combining stage, output stage). Accordingly, the computer 3 functions as a direction information calculating unit, a combining unit, and an output unit.

Figure 6:
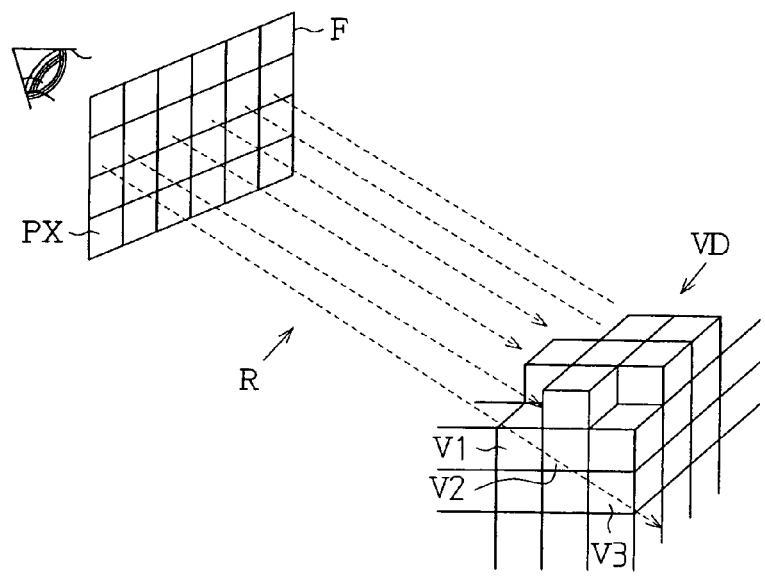
FIG. 6 is a schematic diagram illustrating volume rendering.

As shown in FIG. 6, the voxel data VD as image data of three or more dimensions is a collection of voxels which are three-dimensional pixels of cubic bodies. A density value is allocated as a voxel value to a three-dimensional grid point. In the first embodiment, the pixel values of the CT image data, that is, the CT values, are set as density values.

The CT image data are obtained by cross-section imaging of the body of a patient. The CT image data includes a plurality of slices (cross-sections). Individual slices of the CT image data are two-dimensional cross-section images of bone, blood vessels, internal organs and the like. CT image data including a plurality of adjacent slices are obtained in the cross-section imaging. Accordingly, the CT image data is three-dimensional image data including a plurality of slices.

The CT image data has different CT values for every tissue of the subject (bone, blood vessel, organs and the like). CT values are x-ray attenuation coefficients using water as a standard. For example, the type of tissue or lesion can be determined based on the CT value. Furthermore, the CT value also includes all coordinate data of the cross section image (slice image) of the body scanned by the CT imaging device. The positional relationships between different tissues in the line of sight (depth direction) are discriminated from the coordinate data. In this way the voxel data VD includes CT values (hereinafter referred to as "voxel values") and coordinate data.

Tubular tissue includes, for example, blood vessels, trachea, and alimentary canal (esophagus, stomach, small intestines, and large intestines). In the first embodiment, the large intestines are used in the examples. Tubular tissue also includes tubular structures other than the organs of blood vessels, trachea, alimentary canal, and the like.

An exfoliated picture of tubular tissue is an image generated by projecting the interior wall surface of the tubular tissue on a two-dimensional plane. In the first embodiment, an exfoliated picture is generated by the cylindrical projection method and curvature cylindrical projection method using a cylinder coordinate system and the like among the volume rendering process.

The volume rendering process will now be described. Volume rendering normally uses ray casting. In ray casting, the path of light is considered to be radiating from the observation side (frame F side), as shown in FIG. 6. First, the light rays (rays R) are radiated from pixels PX on the frame side. The reflected light is calculated at the position at which each ray R travels every fixed distance (in FIG. 6, the reference symbols V1, V2, V3, . . . correspond to each voxel at each destination position of the rays R). When a ray destination position is not present on the grid, the voxel value at that position is calculated by an interpolation process using the voxel values of the voxels surrounding the destination position.

When one ray R is radiated from the frame F toward the voxel data VD, the ray R impinges the voxel data VD. Part of the ray R is reflected by the voxel, or absorbed by the voxel, and the remaining part of the ray R passes through the voxel. The part of the ray R that passes through the voxel is repeatedly reflected, absorbed, and transmitted in a similar manner. Then, the absorbed light and reflected light are calculated discretely for each voxel, and the reflected light is computed. A two-dimensional image is generated by calculating the pixel values of an image projected onto a two-dimensional plane (frame F) using this computation.

Figure 7:
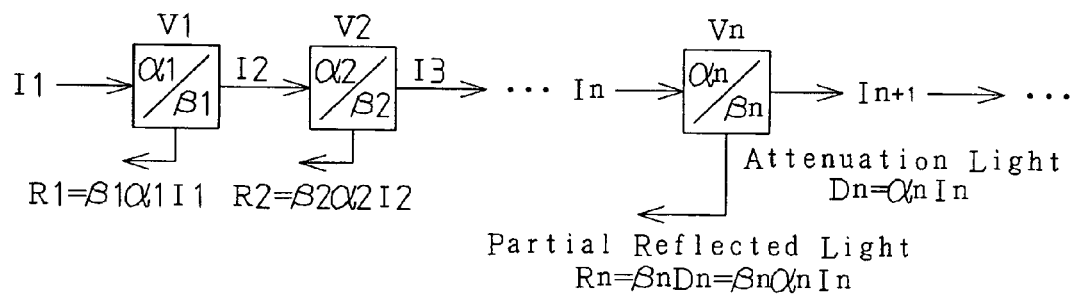
FIG. 7 is a block diagram illustrating volume rendering.

FIG. 7 illustrates the calculation method used in ray casting of the single ray R in FIG. 6. The blocks in FIG. 6 are equivalent to voxels. Each voxel has a degree of non-transparency (opacity value) αn, and a shading coefficient βn as optical property coefficients. The opacity value αn satisfies the expression $0 \leq \alpha n \leq 1$, and the value $(1-\alpha n)$ represents transparency. A value of opacity αn=1 corresponds to full opacity, αn=0 corresponds to transparency, and 0<n<1 corresponds to semi-transparency. The shading coefficient possesses information relating to shading such as gradient and the like.

Initial incidence light (light ray) I1 sequentially passes through each voxel and its residual light (transmission light) is gradually attenuated via partial reflection and absorption by each voxel. The integrated value (integrated reflection light) of the partial reflected light Rn (n=1, 2, . . . ) in each voxel is equivalent to the intensity of the pixel PX in the frame F. Since the attenuation light Dn (n=1, 2, . . . ) is represented by the equation Dn=αnIn using the incidence light In of the $n^{th}$ pixel, the partial reflected light Rn can be expressed by the equation Rn=βnDn=βnαnIn. The equation In+1=(1−αn)In is obtained from the relational equations of the residual light (transmission light) and incidence light in each voxel. Therefore, the pixel value Pv which is the integrated reflection light can be expressed by the following equation.

Pv=β1α1I1+β2α2I2+ . . . +βnAn In=Σβnαn In

Each voxel value is associated with an opacity value αn, and the opacity value αn is obtained from the voxel value based on the relational information. For example, when a volume rendering image of the large intestine is created, the large intestine is displayed by associating an opacity value [1] with the voxel value corresponding to the large intestine, and associating an opacity value [0] with other voxel values.

Figure 8A:
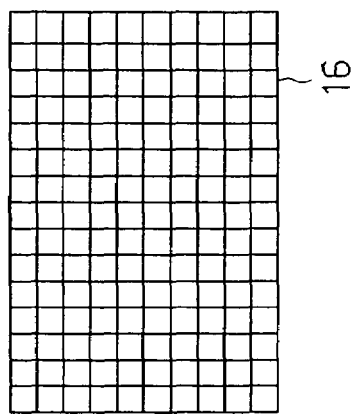
FIGS. 8A through 8C are schematic diagrams illustrating the cylindrical projection method.
Figure 8B:
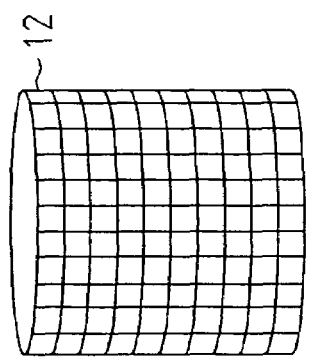
Figure 8C:
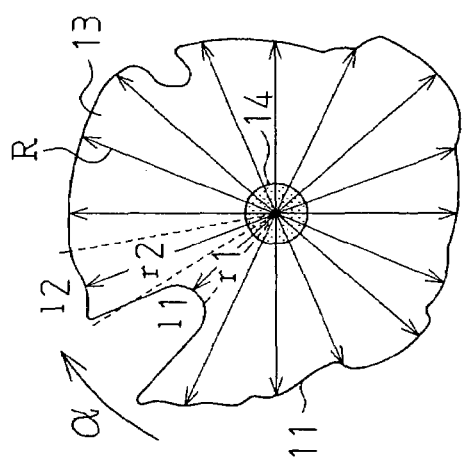

FIGS. 8A through 8C show the process of creating an exfoliated picture of tubular tissue by the cylindrical projection method using voxel data.

Figure 3:
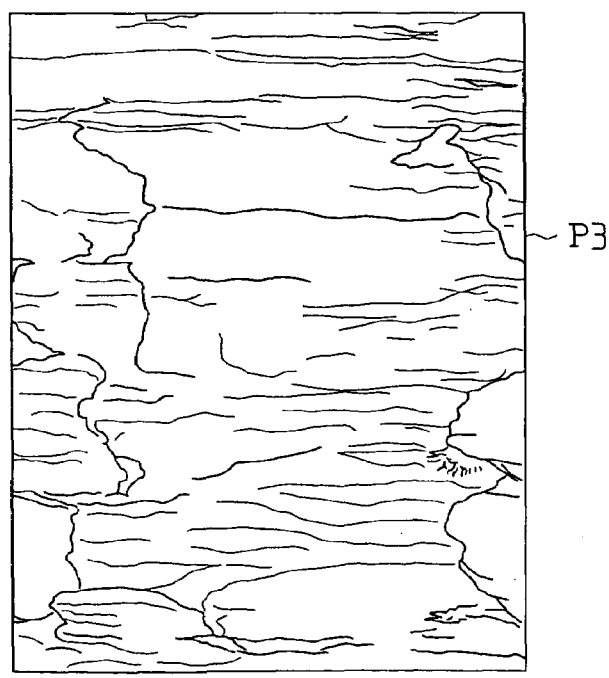
FIG. 3 is a schematic diagram illustrating an exfoliated picture of a tubular organ.

In the cylindrical projection method, a cylindrical coordinate system is hypothesized, and it is assumed that viewpoints are distributed continuously on a center axis 14 (direction perpendicular to the plane of the drawing) of a cylindrical projection surface 12 (refer to FIG. 8) arranged so as to enclose a projection subject 11. Rays R are radially radiated from these viewpoints within a plane 13 perpendicular to the center axis of the cylindrical projection surface within the interior of the projection subject 11, such that the projection subject is projected onto the cylindrical projection surface 12, as shown in FIG. 8B. An exfoliated picture P3, which displays the interior of the tubular tissue, is obtained as shown in FIG. 3 by coordinate conversion of the projection image projected on the cylindrical projection surface 12 to a two-dimensional plane (projection plane) 16, as shown in FIG. 8C.

In general, a tubular tissue is curved. When the entirety of the curved tubular tissue is projected on a cylindrical projection surface, separate parts of the tubular tissue mutually overlap. The curvature cylindrical projection method is used in order to project tubular tissue without overlaps.

Figure 9A:
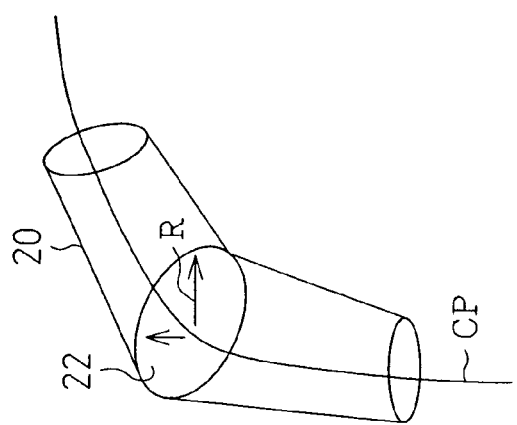
FIGS. 9A through 9C are schematic diagrams illustrating the curvature cylindrical projection method.
Figure 9B:
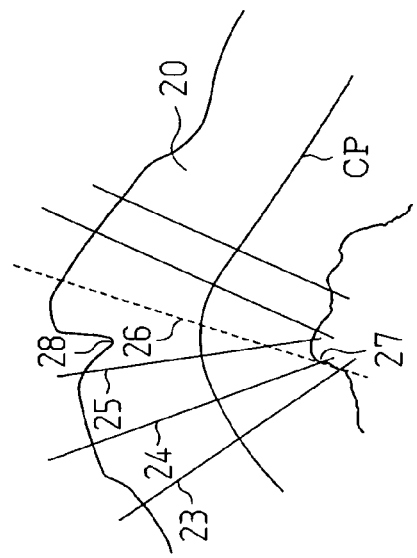
Figure 9C:
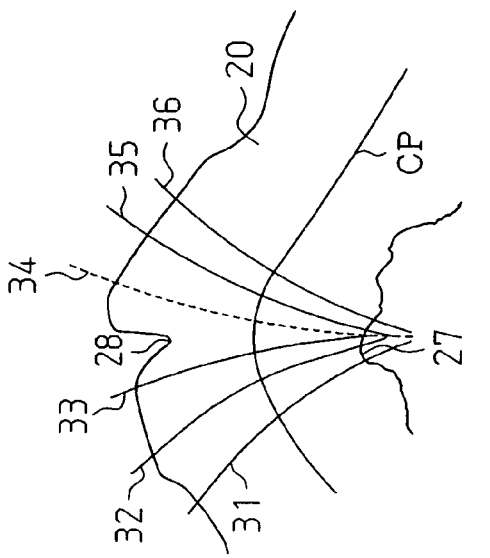

FIGS. 9A through 9C show the process of creating an exfoliated picture of tubular tissue by the curvature cylindrical projection method using voxel data.

The curvature cylindrical projection method assumes a center line CP along the center line of the tubular tissue 20 (tubular body), as shown in FIG. 9A. Viewpoints are assumed to be continuously distributed on this center line CP. Rays R radiate within planes (FIG. 9A only show one plane 22), which are perpendicular to the center line CP, and a projection subject is projected on a cylindrical projection surface (not shown in the drawing), which encloses the exterior side of the projection subject. An exfoliated picture P3, which displays the interior of the tubular tissue, is obtained as if having cut open the cylindrical projection surface, as shown in FIG. 3, by subjecting the projection object projected on the cylindrical projection surface to coordinate conversion to a two-dimensional plane. In this way, a satisfactory exfoliated picture of the curved tubular tissue 20 is created by bending the center line CP so as to conform to the curvature of the tubular tissue 20, and shortening the interplanar distance perpendicular to the center line CP.

In the curvature cylindrical projection method, when the tubular tissue 20 has a large curvature, the planes 23, 24, and 25 that are perpendicular to the center line CP intersect the plane 26, as shown in FIG. 9B. As a result, in the interior wall surface of the tubular tissue 20, some areas are displayed multiple times, or some parts are not displayed at all in the exfoliated picture P3. For example, the polyp 27 is projected by planes 24 and 26, and therefore displayed twice in the exfoliated picture P3. There is no plane to project the polyp 28, however. Accordingly, the polyp 28 is not even displayed once on the exfoliated picture P3 despite its presence in the tubular tissue 20. In order to avoid such an occurrence, non-linear ray casting is performed.

Non-linear ray casting radiates rays R from the center line CP in the curvature cylindrical projection method, as shown in FIG. 9C. Specifically, the rays R do not radiate within a plane perpendicular to the center line CP, but rather radiate within curved planes 31 through 36, which are perpendicular to the center line CP. The non-linear rays R radiate within the curved planes 31 through 36 from the center line CP. In this way, only one plane projects a single point on the polyp 27, such that the polyp 27 is displayed only once in the exfoliated picture P3. The polyp 28 can be projected on the exfoliated picture P3 by increasing the number of planes intersecting the center line CP.

Since the projection image projected on the cylindrical projection surface is unfolded onto a two-dimensional plane, the coordinate data corresponding to the respective pixels forming the exfoliated picture P3 are not coordinate data of the tubular tissue (voxel data VD), but rather are coordinate data on the two-dimensional plane. Therefore, directions in the tubular tissue (three-dimensional directions before unfolding of the projection image on the two-dimensional plane) cannot be comprehended from the exfoliated picture P3 after it is unfolded on the two-dimensional plane.

Figure 10A:
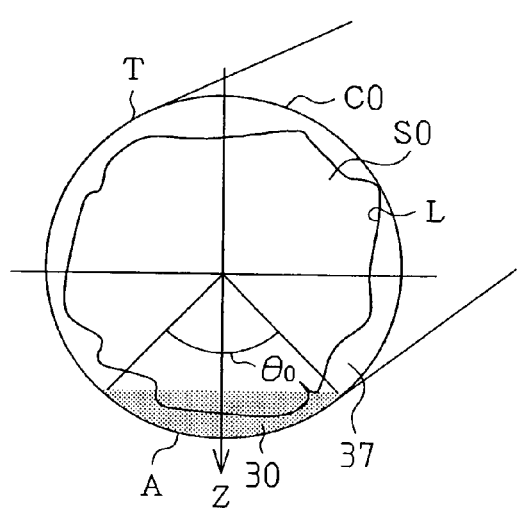
FIGS. 10A through 10D are schematic diagrams illustrating direction information and additional information.
Figure 10B:
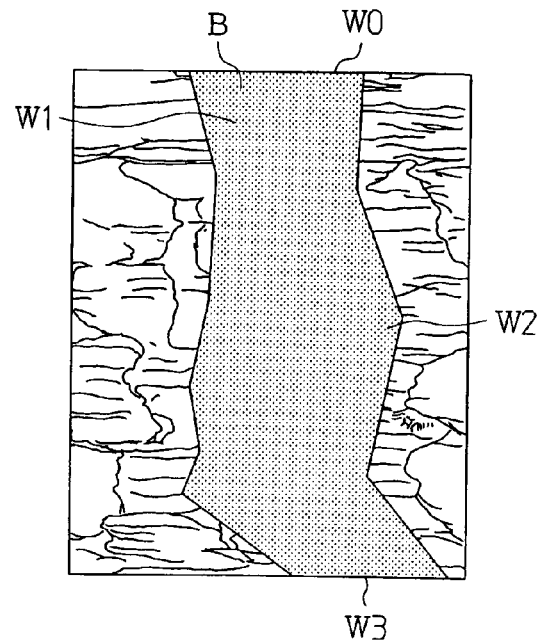

Direction information represents the direction in the tubular tissue in the exfoliated picture P3, and associates the coordinates on the two-dimensional exfoliated picture P3 with the coordinates of the three-dimensional tubular tissue (position data or coordinate data). In the first embodiment, the direction information is displayed on the exfoliated picture P3, and represents, for example, the portion present at the physically lower part of the tubular tissue. As shown in FIG. 10A, for example, the formation of a water path 30 is assumed through which water flows within the tubular tissue T in accordance with gravity. Then, the water path 30 is represented on the exfoliated picture as a band B having a predetermined width, as shown in FIG. 10B. That is, the band B is displayed as direction information on the exfoliated picture P3 so as to form the water path 30 just as though in the lower part of the tubular tissue. In the prior art, a user cannot readily comprehend the lower part of the tubular tissue T in the exfoliated picture P3 due to the twists and curvatures of the tubular tissue T. In the first embodiment, a user is able to intuitively recognize the observation direction and observation position based on the band B even when there are twists and curvatures in the tubular tissue T. A user is able to intuitively comprehend the observation direction and observation position in the exfoliated picture P3 because in particular the width and position of the water path 30, that is, band B, changes at the twists or curves, or the locations of narrowed width of the tubular tissue T.

Specifically, a band B having a width Wd and a band B having a width Ws are used. The width Wd of band B is associated with the inclination of the cross section of the tubular tissue T relative to the vertical direction. The width Ws of the band B is associated with the cross sectional area of the tubular tissue T. For example, a user can intuitively comprehend changes both in the cross sectional area and cross section direction of the tubular tissue T by displaying band B of width Wd and band B of width Ws in different colors or alternately displaying the band B of width Wd and band B of width Ws at fixed times (for example, every 5 seconds). Furthermore, the user can intuitively comprehend a summary of the direction information of the tubular tissue T on the exfoliated picture P3 even when the band B of width Wd and band B of width Ws are simultaneously displayed in the same color.

In the first embodiment, a cross section S0 (refer to FIG. 10A) of the proximal portion of the tubular tissue T is perpendicular to the xy plane in the Cartesian coordinate system. In this case, the initial width value W0 of band B is an arc length relative to a fixed angle $\theta 0$ (refer to FIG. 10A) on the cross section S0 of the proximal portion. Alternatively, the initial value W0 also may be set in association with the cross section S0 of the distal portion of the tubular tissue T. Another alternative is to set the initial value W0 in association with the cross section S0 of the portion of the tubular tissue T having a minimum cross sectional area, maximum cross sectional area, or average cross sectional area. Then, the angle between the direction vector h and downward vector z can be used to represent the inclination of the cross section S1 of the tubular tissue T relative to a vertical direction. The direction vector h is a vector representing the direction of the cross section S1 of the tubular tissue T, and is a unit vector along the center line CP defined in the curvature cylindrical projection method. The downward vector z is a vector representing a downward direction, and is a unit vector indicating the z direction in the Cartesian coordinate system.

Figure 10C:
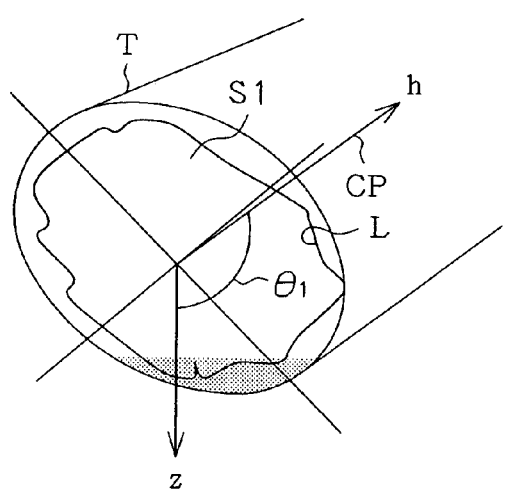

When the tubular tissue T is curved in the vertical direction, the angle between the direction vector h and the downward vector z is determined by the vector exterior product ($h \times z = h \cdot z \cdot \sin \theta$), and the width Wd of band B and the size of the angle are associated with each other. That is, the width Wd of band B becomes narrower as the extension direction of the tubular tissue T approaches parallel to the z direction (the direction of extension of the tubular tissue T nears a vertical direction), and the width Wd of band B becomes wider as the extension direction of the tubular tissue T approaches perpendicular to the z direction (the direction of extension of the tubular tissue T nears a horizontal direction). In FIG. 10C, the cross section S1 of the tubular tissue T is inclined relative to the vertical direction. The width Wd of the band B corresponds to the angle $\theta 1$ between the direction vector h and the downward vector z, and the width W1 of the band B is represented, as shown in FIG. 10B. When the tubular tissue T is twisted, the direction vector h and downward vector z correspond to the band B direction (position) and the band B width Wd, and, for example, width W3 of band B in FIG. 10B is represented. Thus, in the first embodiment, the width Wd of band B includes also position information of the tubular tissue T.

Additional information represents information obtained from the function or external observation of the tubular tissue in the exfoliated picture P3. In the first embodiment, additional information is represented in the exfoliated picture P3, for example, it represents the change in the cross sectional area of the tubular tissue. Additional information is represented by the band B having a predetermined width.

Figure 10D:
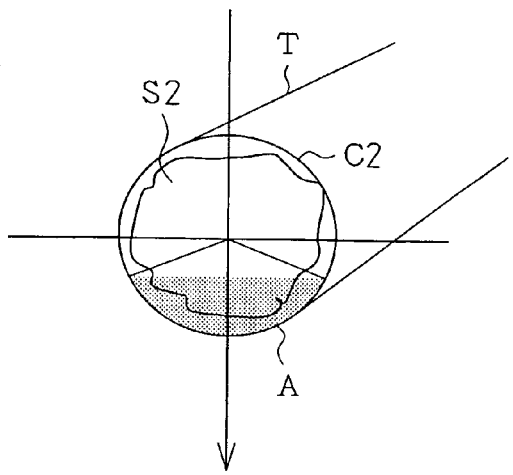
Figure 12:
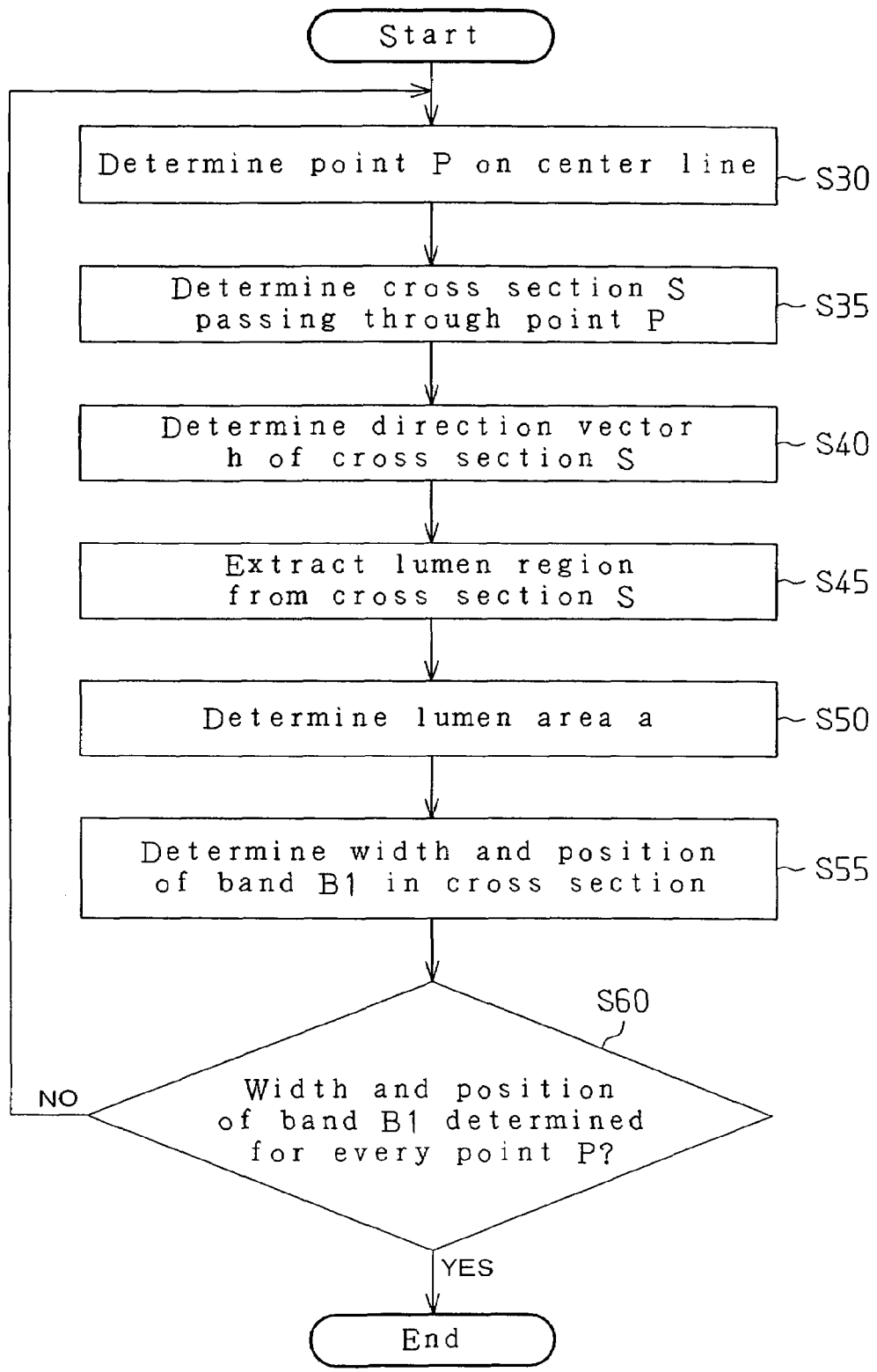
FIG. 12 is a flowchart of the direction information calculation process.

Specifically, when the cross sectional area of the tubular tissue T changes, the ratio of the base cross-sectional area a0 and the lumen cross-sectional area a (a/a0) corresponds to the width Ws of the band B. The base cross-sectional area a0 is the cross-sectional area of the tubular tissue corresponding to the initial width value W0 of the band B. The lumen cross-sectional area a is the area of the inner cavity region (lumen region) L of the tubular tissue T (refer to FIG. 10A). As shown in FIG. 10A, since the internal diameter of the tubular tissue T is reduced by folds and the rinsing 37, the actual area of the lumen region L of the tubular tissue T is small. As shown in FIG. 10D, there are also locations where the external diameter of the tubular tissue T is small. A user can readily comprehend the observation position and observation direction of the tubular tissue T by comprehending the change in the area of the lumen L of the tubular tissue T and the change in the exterior diameter of the tubular tissue T.

The lumen region L can be extracted by reading the voxel data VD which have a voxel value corresponding to the lumen region L, that is, representing the lumen region L, stored in the memory unit 8a. Since the extracted lumen region L includes three-dimensional coordinate data as well as voxel values, the lumen region area a can be calculated using the three-dimensional coordinate data of the lumen region L.

The initial width value W0 of the band B represents the arc length relative to the angle θ0 of the tubular tissue T. As shown in FIG. 10D, the ratio of the arc A, which has a length corresponding to the initial value W0, to the circumference of the tubular tissue T increases in conjunction with the decrease in the cross section S2 of the tubular tissue T, that is, the reduction in the length of the circumference of the tubular tissue T. For example, the ratio of the arc A to the circumference C2 of the tubular tissue T (refer to FIG. 10D) is larger than the ratio of the arc A to the circumference C0 of the tubular tissue T (refer to FIG. 10A). As a result, a large width is represented compared to the width of the initial width value W0, for example, as shown by the width W2 of the band B in FIG. 10B.

Figure 5:
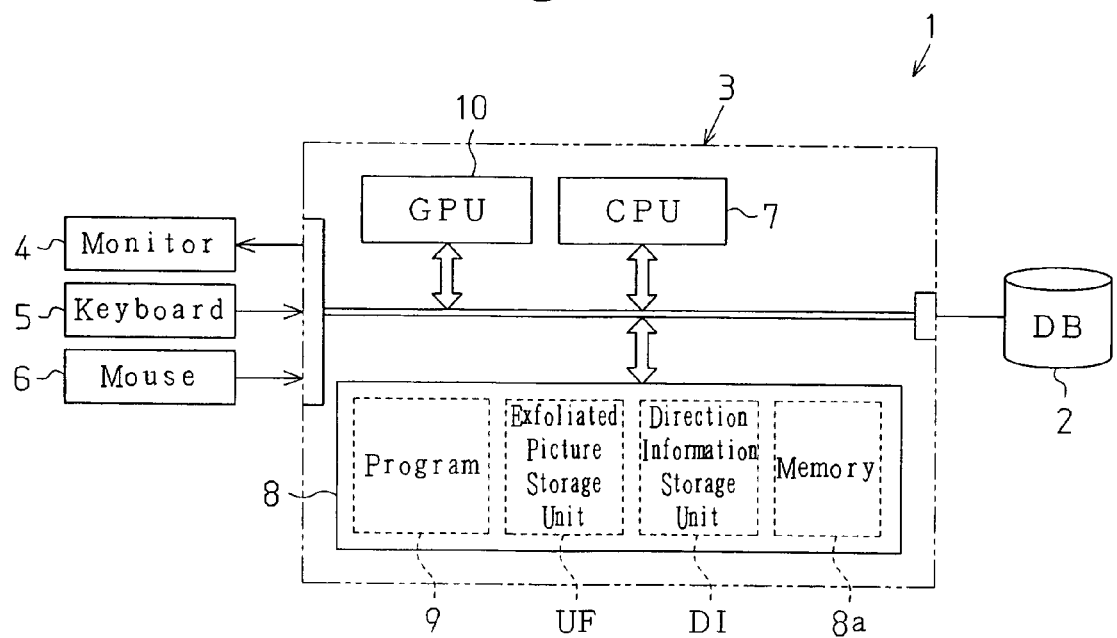
FIG. 5 is a schematic block diagram showing the structure of the image display device of FIG. 4.

As shown in FIG. 5, the computer 3 is provided with a graphics processing unit (GPU) 10. The GPU 10 is a graphics controller chip, which mainly supports high performance three-dimensional graphics functions and which performs high-speed two-dimensional and three-dimensional graphics drawing functions based on user specified programs. In the first embodiment, post processing is executed by the GPU 10. In this way, the time required for displaying direction information and additional information is reduced.

In post processing, color, contrast, and brightness are corrected to display the calculated direction information and the calculated additional information on an output device such as the monitor 4. Since the output (for example, a CT image, MRI image) of many medical diagnostic devices are 12-bit gradient data, the exfoliated picture P3, which includes direction information and additional information calculated by the exfoliated picture projection process, also is 12-bit gradient data. However, the monitor 4 of the computer 3 and the like often represent RGB colors as 8-bit data. Therefore, color, contrast, and brightness are converted for the monitor 4 by a window level (WL) transformation and color look-up table (LUT) transformation. Image data are also converted for display on the monitor 4 by aligning the size of the image to the screen using affine transformation.

The exfoliated picture projection process performed by the image display device 1 will now be described.

In the first embodiment, an exfoliated picture unfolded by the exfoliated picture calculation process, that is, the curvature cylindrical projection process, is stored beforehand in the exfoliated picture storage unit UF of the memory 8. Since the exfoliated picture calculation process is a known method, detailed description of the operation is omitted. Then, the direction information and additional information of the exfoliated picture P3 are calculated by the exfoliated picture projection process.

Figure 13A:
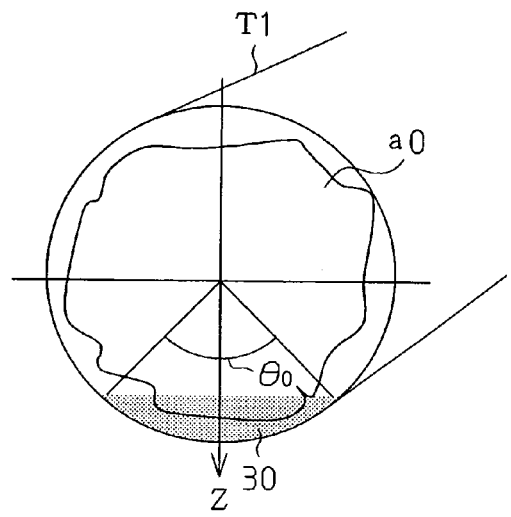
FIGS. 13A and 13B are schematic diagrams of the direction information calculation process.
Figure 13B:
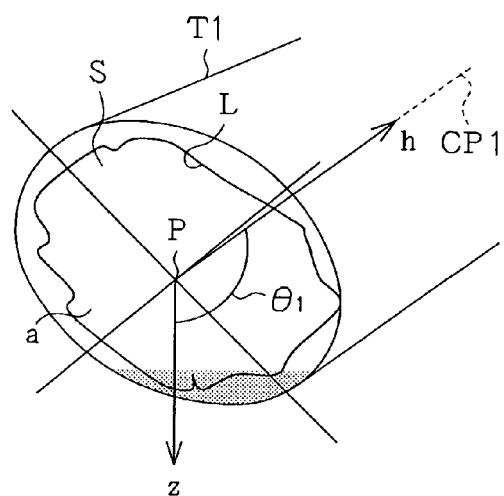

FIG. 11 is a flowchart of the entire exfoliated picture calculation process. First, a user determines the base cross-sectional area a0 (step S10). In the first embodiment, for example, the user sets the cross-sectional area of the proximal portion of the tubular tissue T as the base cross-sectional area a0, as shown in FIG. 13A. The base cross-sectional area a0 is stored in the memory unit 8a. Then, the user determines the downward vector z (step S15). In the first embodiment, the user determines the downward vector z, for example, as shown in FIG. 13B, and the downward vector z is stored in the memory unit 8a. Then, the user sets the path (center line CP1) representing the tubular tissue T (step S20). In the first embodiment, the user sets the center line CP1 of the tubular tissue T, for example, as shown in FIG. 13B, and the center line CP1 is stored in the memory unit 8a.

Next, the CPU 7 determines the direction information and additional information for each point P on the center line CP1 (step S25). In determining the direction information and additional information for each point P on the center line CP1, the CPU 7 executes the processes shown in steps S30 through S60 of FIG. 12 for each point P on the center line CP1.

First, the CPU 7 determines the points P on the center line CP1 (step S30). In the first embodiment, the CPU 7 determines the points P as shown in FIG. 13B. Points P are arrayed at predetermined spacing on the center line CP1. The predetermined spacing may be a fixed value, or a variable value. For example, when it is desired to accurately display the direction information and additional information, points P are set with narrow spacing. When it is desired to verify a summary of the direction information and additional information in a short time, the points P are set with wide spacing. Alternatively, points P can be set with narrow spacing at the locations of curves in the tubular tissue T1. The points P can be set with wide spacing at locations where the tubular tissue T1 is straight. After setting the points P, the CPU 7 determines the cross sections S passing through the points P (step S35). In the first embodiment, the CPU 7 determines the cross sections S, as shown in FIG. 13B. Next, the CPU 7 determines the direction vector h representing the direction of the cross sections S (step S40). In the first embodiment, the CPU 7 determines the direction vector h as shown in FIG. 13B, and stores the direction vector h in the memory unit 8a.

Then, the CPU 7 extracts the lumen region L from the cross section S (step S45). In the first embodiment, the CPU 7 can extract the region of the lumen region L by reading the voxel data VD of the lumen region L (refer to FIG. 13B) stored in the memory unit 8a. Then, the CPU 7 determines the lumen region area a (step S50). The CPU 7 calculates the lumen region area a (refer to FIG. 13B) using the coordinates of the lumen region L.

Figure 14:
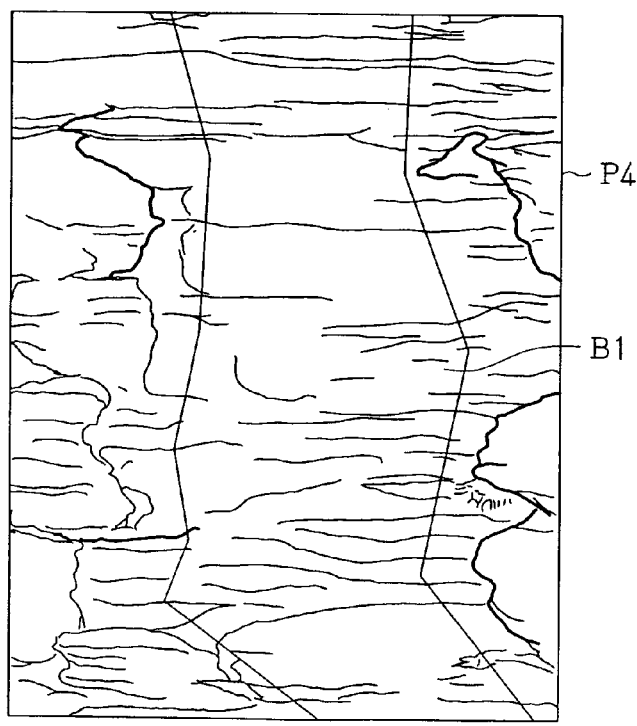
FIG. 14 is a schematic diagram of an exfoliated picture including overlaid direction information and additional information.

Next, the CPU 7 determines the direction information and additional information in the cross section S, that is, the width and position of the band B, as shown in FIG. 14 (step S55). Specifically, the CPU 7 determines the direction information, that is, the width Wd of the band representing the inclination of the cross section S of the tubular tissue T1, using the angle between the direction vector h and the downward vector z on the base of the initial width value W0 of the width of the band B1, and stores this data in the direction information storage unit DI of the memory 8.

The CPU 7 determines the width Ws of the band representing additional information, that is, the change in the cross section area, using the ratio of the base cross-sectional area a0 and the lumen region area a, and stores the data in the direction information storage unit DI. In the first embodiment, the image display device 1 displays the band of width Ws and the band of width Wd in the same color as band B1.

Thereafter, the CPU 7 determines whether or not the width (direction information, additional information) of the band B1 has been determined for all points P (step S60). Since the CPU 7 has only determined the direction information and additional information of a single point P at this time (step S60: NO), the direction information and additional information determining process is again executed for each point P on the center line CP1. The CPU 7 similarly determines the width of band B1 for all points P by executing steps S30 through S60. When the width of band B1 at all points P have been determined (step S60: YES), the CPU 7 reads the exfoliated picture P3 from the exfoliated picture storage unit UF. Further, the CPU 7 reads the direction information (width Wd of band B1) and additional information (width Ws of band B1) at each point P from the direction information storage unit DI. The CPU 7 synthesizes the exfoliated picture P3, the direction information, and the additional information, to generate a synthesized picture CI1, which includes the direction information and additional information overlaid on the exfoliated picture P3 (step S80 in FIG. 11).

The synthesized picture CI1 is subjected to post processing by the GPU 10, and an exfoliated picture P4 is generated as a new exfoliated picture (refer to FIG. 14) (step S85). When the post processing ends, the exfoliated picture P4 is output to the screen 4a (refer to FIG. 4) of the monitor 4 (step S90). As shown in FIG. 14, the direction information and additional information, that is, the band B1, is added to the exfoliated picture P4 after the exfoliated picture projection process ends. Accordingly, a user can easily observe the lumen surface of the tubular tissue T1 in the exfoliated picture P4, and can intuitively comprehend the observation position and observation direction.

In the exfoliated picture P4, the width Wd of the band B1 narrows as the extension direction of the tubular tissue T1 approaches the vertical direction, and the width Wd of the band B1 widens as the extension direction of the tubular tissue T1 approaches the horizontal direction. The band B1 is directed to the right side or the left side of the tubular tissue T1 in FIG. 14 according to the twisting of the tubular tissue T1. Furthermore, the width Ws of the band B1 narrows as the exterior diameter of the tubular tissue T1 increases, and the width Ws of the band B1 widens as the exterior diameter of the tubular tissue T1 decreases. Accordingly, the user comprehends the change in the external diameter and direction in the tubular tissue T1 in the exfoliated picture P4 based on the width of the band B1, the change in this width and the degree of change in the width. The user intuitively associates the exfoliated picture P4 with the tubular tissue T1 based on this change.

The image display device 1 of the first embodiment has the advantages described below.

(1) The direction information and additional information in the exfoliated picture P3 of the tubular tissue T1 unfolded by the curvature cylindrical projection process are represented by the band B1 having a width which imitates the water path formed in accordance with gravity in the interior of the tubular tissue T1. As a result, the user can comprehend the observation direction and observation position of the exfoliated picture. That is, the width Wd of the band B1 narrows as the extension direction of the tubular tissue T1 approaches the vertical direction, and the width Wd of the band B1 widens as the extension direction of the tubular tissue T1 approaches the horizontal direction. Furthermore, the band B1 is directed to the right side or the left side of the exfoliated picture P4 in FIG. 14 according to the twists in the tubular tissue T1. The width Ws of the band B1 narrows as the exterior diameter of the tubular tissue T1 increases, and the width Ws of the band B1 widens as the exterior diameter of the tubular tissue T1 decreases. That is, the user can comprehend the change in the diameter and direction of the tubular tissue T1 in the exfoliated picture P4, the width of the band B1, the change in the width, and the degree of change in the width. Accordingly, the user intuitively associates the exfoliated picture P4 with the tubular tissue T1 based on these changes.

(2) The image display device 1 generates a new exfoliated picture P4 by displaying the direction information and additional information of the tubular tissue T1 overlaid on the exfoliated picture P3. Accordingly, the user can easily observe the interior wall of the tubular tissue T1, and intuitively comprehends the observation position and observation direction.

(3) The direction information indicates the direction of the tubular tissue T1, that is, displays the inclination of the cross section of the tubular tissue T1, and the additional information displays the change in the cross-sectional area of the tubular tissue T1. Accordingly, the user more accurately comprehends the observation direction and observation position.

(4) The width Wd of the band B1 representing the direction information also includes the position information, and is calculated using the angle θ between the direction vector h representing the direction of the cross section S in the tubular tissue T1, and the downward vector z representing the z direction in a Cartesian coordinate system. The widths Ws of the band B1 representing the additional information is calculated using the ratio of the base cross-ssectional area a0 and the lumen region area a of the tubular tissue T1. In this way, the direction information and additional information respectively representing the observation direction and observation position in the exfoliated picture can easily be computed.

Second Embodiment

Figure 15:
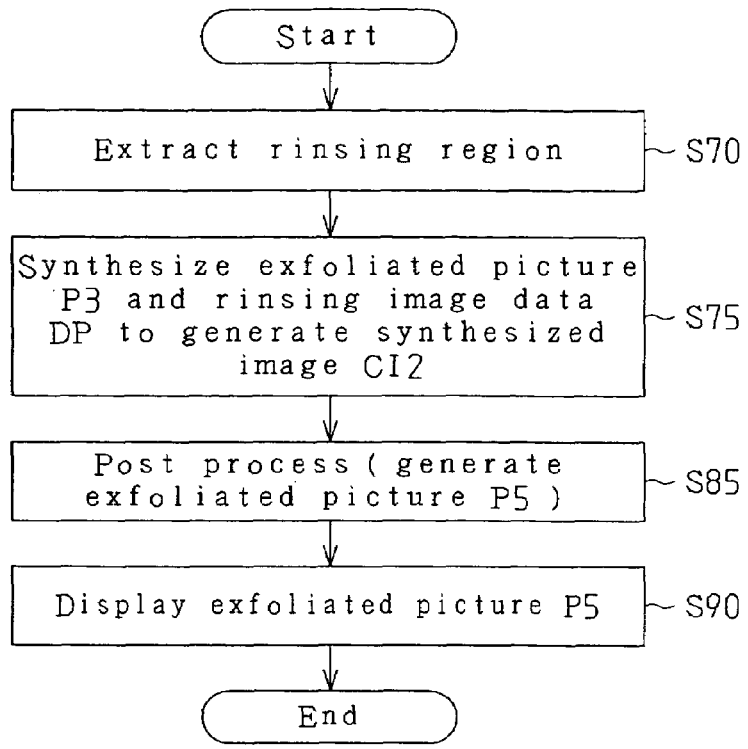
FIG. 15 is a flowchart of an exfoliated picture projection process according to a second embodiment of the present invention.
Figure 16:
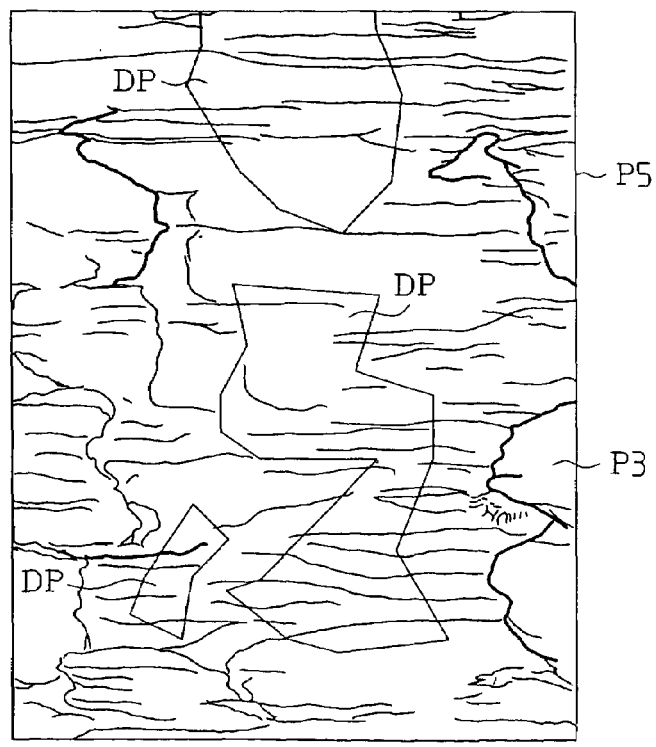
FIG. 16 is a schematic diagram of an exfoliated picture including overlaid rinsing image data.

A second embodiment of the image display device 1 of the present invention will now be described below with reference to FIGS. 15 and 16. The feature of the second embodiment is in that the rinsing in the tubular tissue T is displayed in the exfoliated picture.

Rinsing is a residue, such as intestinal fluid and feces, remaining in the body during the CT image scan, and accumulates at locations in a physically lower position in the human body during CT image scanning. Since polyps can be buried in rinsing, or a user may mistake rinsing for a polyp, rinsing may hinder the discovery of polyps. Accordingly, mistaking rinsing for a polyp is suppressed while allowing easy comprehension of the lower part of the tubular tissue by displaying the rinsing in the exfoliated picture P3. Just the rinsing can be extracted from a region since rinsing has a CT value different than other tissue (bone, blood vessels, and organs). That is, voxel data of only rising is represented by associating an opacity value [1] with voxel values of voxels that correspond to rinsing.

The exfoliated picture projection process of the second embodiment will now be described.

First, for example, an exfoliated picture of the large intestines unfolded by the curvature cylindrical projection method is stored in the exfoliated picture storage unit UF in the same manner as in the first embodiment. Thereafter, the CPU 7 extracts the rinsing region (step S70). Then, the CPU 7 synthesizes the extracted rinsing image data DP and the exfoliated picture P3 read from the exfoliated picture storage unit UF to generate a synthesized picture CI2 (step S75). The synthesized picture CI2 is subjected to post processing by the GPU 10 to generate an exfoliated picture P5 (step S85). When the post processing ends, the exfoliated picture P5 is output to the screen 4a of the monitor 4 (refer to FIG. 4) (step S90). In this state, as shown in FIG. 16, the exfoliated picture P5 is displayed with the included rinsing image data DP. This prevents erroneous identification of the rinsing as a polyp and the lower part of the tubular tissue T is intuitively comprehended.

In addition to the advantages of the first embodiment, the image display device 1 of the second embodiment has the advantages described below.

(1) The image display device 1 extracts the rinsing region, and combines the rinsing image data DP and the exfoliated picture P3 to generate the exfoliated picture P5. The image display device 1 outputs the exfoliated picture P5 to the screen 4a of the monitor 4. Accordingly, when a user, for example, diagnoses the presence or absence of polyps when viewing the exfoliated picture P5, erroneous identification of the rinsing for a polyp is suppressed.

(2) The image display device 1 extracts the rinsing region physically present at the lower part of the tubular tissue T, and synthesizes the rinsing image data DP and the exfoliated picture P3 to generate the exfoliated picture PS. The image display device 1 outputs the exfoliated picture P5 to the screen 4a of the monitor 4. Accordingly, the user intuitively comprehends the lower part of the tubular tissue T.

Third Embodiment

In the first and second embodiments, a single computer 3, such as a workstation or the like, independently executes the exfoliated picture projection process. Alternatively, in the third embodiment, at least one process among the plurality of processes included in the exfoliated picture projection process is distributed to and executed by a plurality of computers.

Figure 17:
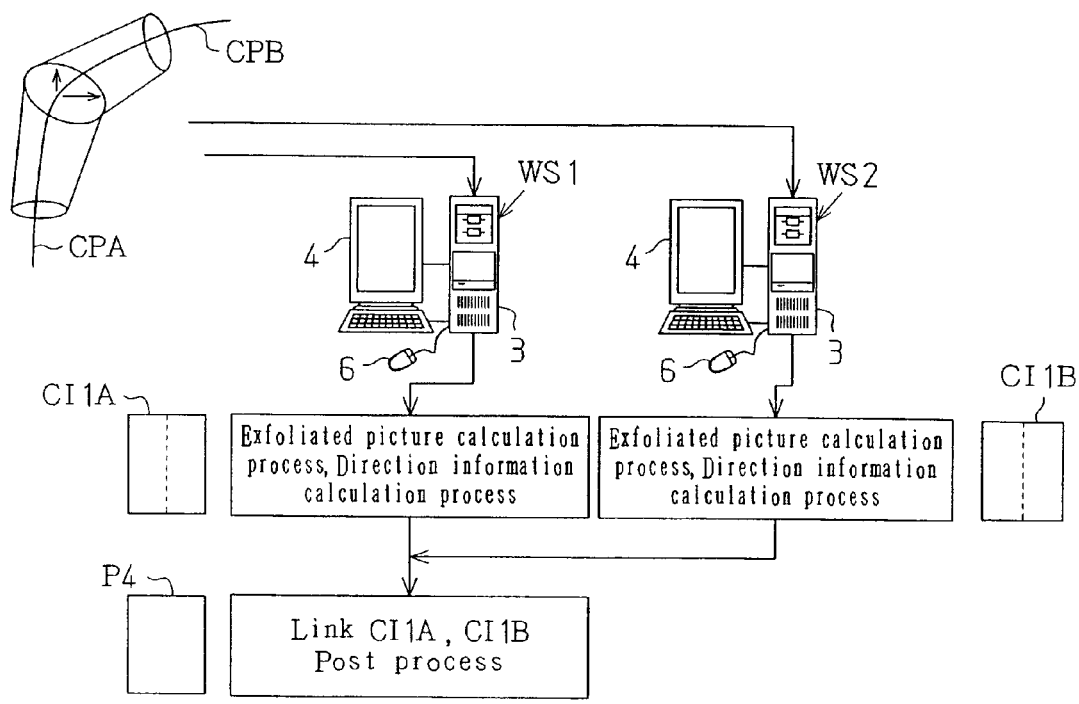
FIG. 17 is a block diagram of an exfoliated picture projection process of a first example in a third embodiment of the present invention.
Figure 18:
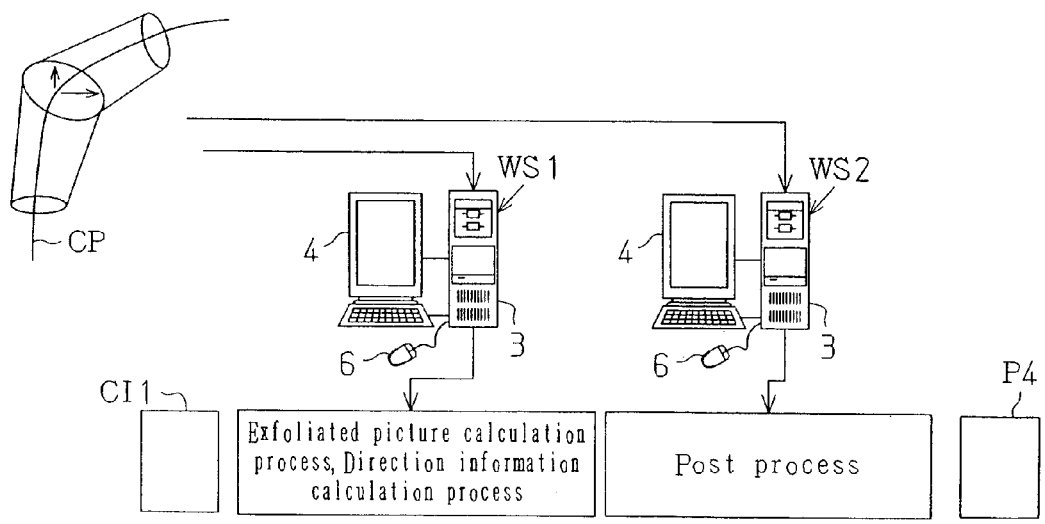
FIG. 18 is a block diagram of an exfoliated picture projection process of a second example in the third embodiment.
Figure 19:
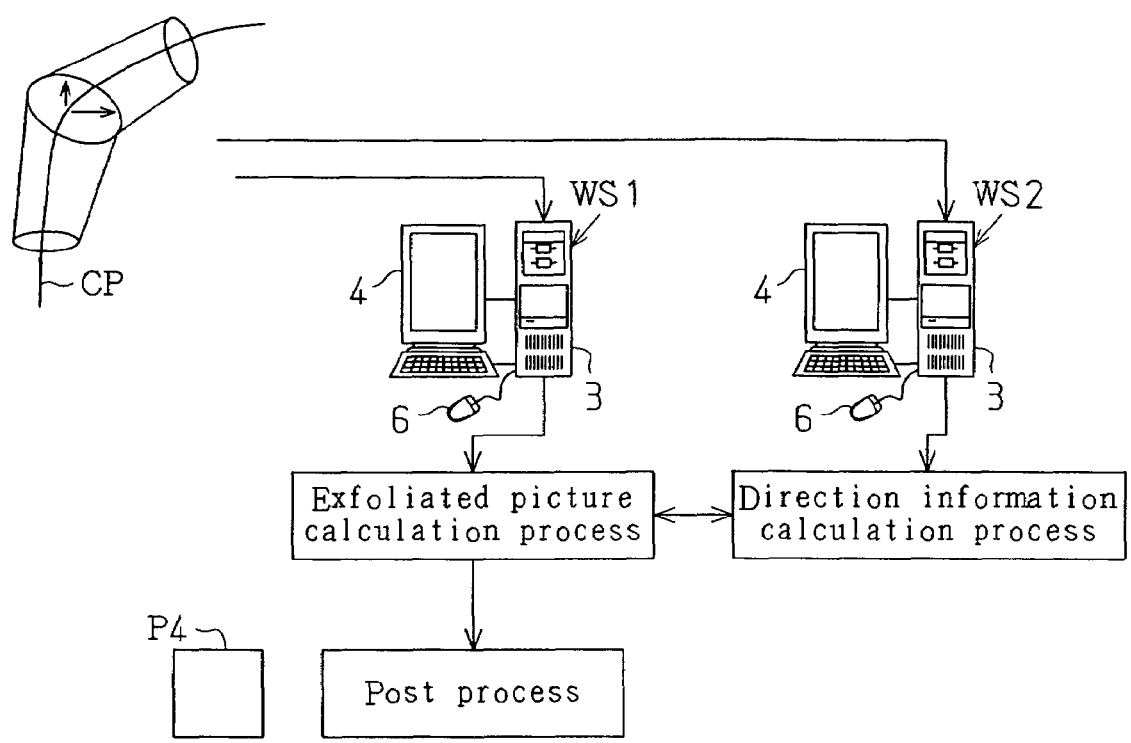
FIG. 19 is a block diagram of an exfoliated picture projection process of a third example in the third embodiment.

For example, in an in-hospital network such as PACS (picture archiving and communication system), to which a plurality of workstations are connected, at least one process may be distributed to a plurality of workstations to execute the process. Described below are three examples of the distributed execution of the exfoliated picture projection process. In a first example, the length of the center line CP is divided. In the second example, only the post processing is distributed after the exfoliated picture projection process. In the third example, the exfoliated picture calculation process and the direction information calculation process are separated. To facilitate the following discussion, the examples are discussed in terms of two workstations WS1 and WS2 creating a 512×512 image, as shown in FIGS. 17 through 19. Alternatively, the process of creating the image may be distributed to three or more workstations. In the third embodiment, one of the workstations WS1 and WS2 is provided with a GPU 10.

EXAMPLE 1

In example 1, the center line CP is divided into a center line CPA and a center line CPB, as shown in FIG. 17. Rays radiate from the center line CPA toward the voxels V1 through Vk. Rays radiate from the center line CPB toward the voxels Vk+1 through Vn. In this case, each workstation WS1 and WS2 performs the exfoliated picture calculation process and direction information calculation process. In this configuration, the memory resource and transfer resource of the exfoliated picture storage unit UF and the direction information storage unit DI of each workstation requires only one half the entire exfoliated picture. The processing sequence is described below.

(1-1) The workstation WS1 executes the exfoliated picture calculation process and direction information calculation process for the voxel data VD (voxels V1 through Vk) on the center line CPA. Then, the workstation WS1 stores the calculated exfoliated picture in the exfoliated picture storage unit UF, and stores the calculated direction information and additional information in the direction information storage unit DI. Similarly, the workstation WS2 executes the exfoliated picture calculation process and direction information calculation process for the voxel data VD (voxels Vk+1 through Vn) on the center line CPB. Then, the workstation WS2 stores the calculated exfoliated picture in the exfoliated picture storage unit UF, and stores the calculated direction information and additional information in the direction information storage unit DI.

(1-2) The workstation WS2 synthesizes the exfoliated picture, the direction information, and the additional information stored in the exfoliated picture storage unit UF and the direction information storage unit DI to generate a synthesized picture CI1B. The workstation WS2 then transmits the synthesized picture CI1B to the workstation WS1. The size of the transfer at this time is 512×256.

(1-3) The workstation WS1 synthesizes the exfoliated picture, the direction information, and the additional information stored in the exfoliated picture storage unit UF and the direction information storage unit. DI to generate a synthesized picture CI1A. Then, the workstation WS1 synthesizes the synthesized picture CI1A, which it generated, with the synthesized picture CI1B generated by the workstation WS2 to generate a synthesized picture CI1. The work station WS1 performs post processing on the synthesized picture. CI1 to obtain an exfoliated picture P4, which includes visualized direction information and additional information.

EXAMPLE 2

In example 2, only the post processing is separated from the exfoliated picture projection process. As shown in FIG. 18, all of the voxel data VD is subjected to the exfoliated picture calculation process and the direction information calculation process by the workstation WS1. Post processing is executed by the workstation WS2 which is provided with a GPU 10 suited for high-speed image processing. In this configuration, the time required for post processing is reduced. The processing sequence is described below.

(2-1) The workstation WS1 subjects the voxel data VD to the exfoliated picture calculation process and the direction information calculation process. Then, the workstation WS1 stores the calculated exfoliated picture P3 in the exfoliated picture storage unit UF, and stores the calculated direction information and additional information in the direction information storage unit DI.

(2-2) The workstation WS1 synthesizes the exfoliated picture P3, direction information, and additional information stored in the exfoliated picture storage unit UF and the direction information storage unit DI to generate a synthesized picture CI1, and transmits the synthesized picture CI1 to the workstation WS2. The size of the transfer at this time is 512×512.

(2-3) The workstation WS2 subjects the synthesized picture CI1 to post processing to obtain an exfoliated picture P4 which includes visualized direction information and additional information.

EXAMPLE 3

In example 3, the exfoliated picture calculation process and direction information calculation process are divided. As shown in FIG. 19, data is transferred a multiple number of times between the workstations WS1 and WS2. However, the overall processing speed is improved since the exfoliated picture calculation process and the direction information calculation process are executed in parallel.

(3-1) The workstation WS1 subjects the voxel data VD to the exfoliated picture calculation process. Then, when the exfoliated picture P3 is calculated for each cross sect-ion S, the workstation WS1 transmits the exfoliated pictures P3 to the workstation WS2. Each exfoliated picture P3 is stored in the exfoliated picture storage unit UF of the workstation WS2.

(3-2) While the workstation WS1 executes the exfoliated picture calculation process, the workstation WS2 executes the direction information calculation process. The workstation WS2 synthesizes the exfoliated picture P3, direction information, and additional information and generates a synthesized picture CI1 for each cross section S after the exfoliated picture calculation process and direction information calculation process have ended.

(3-3) When a synthesized picture CI1 corresponding to all of the voxel data VD is generated, the workstation WS2 transmits the synthesized picture CI1 to the workstation WS1. Then, the workstation WS1 subjects the synthesized picture CI1 to post processing to obtain an exfoliated picture P4, which includes visualized direction information and additional information. The overall processing speed is improved since the post processing is executed by the workstation WS2, which is provided with a GPU 10 suited for high-speed image processing.

In addition to the advantages of the first and second embodiments, the third embodiment has the advantages described below.

(1) Since a plurality of computers 3 are used for distributed processing, the speed of the exfoliated picture projection process is increased. For example, an exfoliated picture P4 including overlaid direction information and additional information is directly displayed on the monitor 4, thereby easily ensuring the real time quality of the exfoliated picture P4.

(2) Since a plurality of computers 3 are used for distributed processing, there is a reduction in the memory resources used in the exfoliated picture storage unit UF and the direction information storage unit DI.

It should be apparent to those skilled in the art that the present invention may be embodied in many other specific forms without departing from the spirit or scope of the invention. Particularly, it should be understood that the present invention may be embodied in the following forms.

In the first embodiment, direction information and additional information are expressed by a band B1 having a width. Alternatively, the direction information and additional information may also be expressed as a color different from the color of the exfoliated picture P3, a transparency different from the transparency of the exfoliated picture P3, flashing (flashing animation), a numeric value (coordinate), or a line. That is, the direction information and additional information may be displayed as an overlay on the exfoliated picture P3 such that the user can intuitively comprehend the direction information and additional information.

In the first embodiment, the initial width W0 of the band B is a fixed value. However, the image display device 1 may be configured such that a user can change the initial width W0 of the band B using the keyboard 5 or mouse 6.

In the first embodiment, the initial width W0 of the band B is defined as an arc length corresponding to degree θ0. Alternatively, a predetermined width of the band B may be defined as the initial width W0 or the distance from the viewpoint to the tubular tissue T1 may be defined as the initial width W0 of the band B.

In the first embodiment, direction information and additional information are expressed by a colored band B. Alternatively, direction information and additional information may also be expressed by a band B generated by a process such as a hatching process, shadowing process, glossing process, semi-transparency process, three-dimensional elevation process and the like.

In the first embodiment, the image display device 1 displays direction information representing the lower part of the tubular tissue T. However, there may be times when a user needs to view a laterally symmetrical organ and require clear lateral directions of the organ. In these instances, the image display device 1 also may display direction information representing the right direction and left direction of the organ. Furthermore, when a user views an image projected from an inclined direction, such as in angio-projections, the image display device 1 also may display direction information representing the direction of inclination relative to the organ. That is, the direction information displayed by the image display device 1 is not limited to the downward direction, and may be any direction.

In the first embodiment, the image display device 1 displays the change in the cross-sectional area of the tubular body as additional information. However, the displayed additional information also may be cross section coordinates, specifically weighted cross section coordinates, thickness of the tubular body, amount of blood flow, relative position of a cross section in a tubular body, distance from the end of the tubular body, information obtained from an external source, information calculated from voxel data VD, or combinations thereof.

In the first embodiment, the image display device 1 displays band B representing direction information and additional information. Alternatively, the image display device 1 may display a band B representing only direction information.

In the second embodiment, rinsing is extracted. However, extraction is not limited to rinsing, inasmuch as materials present in organs and internally, such as fat, bone, blood vessels, air, and the like may also be extracted.

In the second embodiment, rinsing is displayed by coloring. Alternatively, rinsing also may be displayed by processing, such as a hatching process, shadowing process, glossing process, semi-transparency process, three-dimensional elevation process, and the like.

In the second embodiment, the rinsing region is extracted, and the rinsing image data DP and exfoliated picture P3 are synthesized. Alternatively, both the rinsing and direction information (additional information) may be synthesized with the exfoliated picture P3. As a result, erroneous diagnosis of the rinsing for a polyp is suppressed, and the user can more easily recognize the direction information and additional information. Furthermore, a user can easily recognize both rinsing and direction information (additional information) in the exfoliated picture P3 by displaying the rinsing image data DP and band B in different colors or by alternately displaying the rinsing image data DP and band B at certain intervals.

In the second embodiment, the rinsing region is extracted, and the rinsing image data DP and exfoliated picture P3 are synthesized. The opacity α corresponding to the rinsing voxels also may be suitably changed at this time. For example, in a state in which the opacity α satisfies 0<αn<1, that is, in a semitransparent state, the tubular tissue T can be recognized with the rinsing image data DP by combining the semitransparent rinsing image data DP with the exfoliated picture P3.

In the third embodiment, network distributed processing is performed by the workstations WS1 and WS2 connected to the network. Alternatively, a single computer provided with multiple processor chips also may perform distributed processing.

In the above embodiments, an exfoliated picture is generated by volume rendering. Alternatively, exfoliated pictures also may be generated by surface rendering. Furthermore, exfoliated pictures also may be generated by a combination of volume rendering and surface rendering.

In the above embodiments, three-dimensional image data is subjected to direction information calculation processing. Alternatively, data of four or more dimensions may be subjected to direction information calculation processing.

In the above embodiments, CT images of parts of a human body, such as bone and organs, are subjected to exfoliated picture projection processing. However, subjects included in the image are not limited to living tissue such as humans, animals, or plants insofar as such subjects can be CT scanned. For example, the present invention is applicable to geological surveys, mining surveys, structural elements of machinery or various types of devices, image processing for viewing patterns of electrical circuits, LSI problem diagnostics, and the like.

The present examples and embodiments are to be considered as illustrative and not restrictive, and the invention is not to be limited to the details given herein, but may be modified within the scope and equivalence of the appended claims.

What is claimed is:

1. A method for generating an exfoliated picture of image data of a subject rendered on a three-dimensional hypothetical surface from each of points continuously distributed on a hypothetical center line defined in the image data, wherein the image data includes a plurality of pixels, each having position data, the method comprising:
   calculating physical direction information of the subject for each of the points on the hypothetical center line using the position data of the pixels;
   generating the exfoliated picture with the physical direction information, wherein said generating the exfoliated picture includes generating the exfoliated picture so as to visualize the physical direction information of the subject in the exfoliated picture; and
   displaying the exfoliated picture with the physical direction information with reference to gravity as indicated by a fluid path.

2. The method of claim 1, wherein the position data is coordinate data of a Cartesian coordinate system for each of the pixels.

3. The method of claim 1, further comprising;
   extracting a region from the image data;
   wherein said generating the exfoliated picture includes generating the exfoliated picture with the physical direction information and information of the region that is extracted.

4. The method of claim 1, wherein image data includes image data of a tubular body.

5. The method of claim 1, further comprising:
   calculating additional information relating to the image data with the position data of the pixels; and
   adding the additional information to the physical direction information.

6. The method of claim 5, wherein the image data includes image data of a tubular body, the method further comprising:
   defining a plurality of cross sections of the tubular body;
   wherein said calculating additional information includes calculating additional information including at least one of change in area of each cross section of the tubular body, distance from a base position to each cross section of the tubular body, and a coordinate for each cross section of the tubular body.

7. The method of claim 5, wherein said calculating physical direction information includes calculating physical direction information including at least one of change in inclination of each cross section of the tubular body and twisting of the tubular body.

8. The method of claim 1, wherein said generating the exfoliated picture includes generating the exfoliated picture so as to express a band-like image of which width or position changes in accordance with the position data of the pixels.

9. The method of claim 1, wherein said generating the exfoliated picture includes generating the exfoliated picture so as to express at least one of the physical direction information and additional information relating to the image data with a numerical value.

10. The method of claim 1, wherein said generating the exfoliated picture includes generating the exfoliated picture so as to express at least one of the physical direction information and additional information relating to the image data with a color.

11. The method of claim 1, wherein said generating the exfoliated picture includes generating the exfoliated picture so as to express at least one of the image information and additional information relating to the image data with at least one line.

12. The method of claim 1, wherein said generating the exfoliated picture includes generating the exfoliated picture so as to express at least one of the physical direction information and additional information relating to the image data with transparency.

13. The method of claim 1, wherein said generating the exfoliated picture includes generating the exfoliated picture so as to express at least one of the physical direction information and additional information relating to the image data with flashing animation.

14. The method of claim 1, wherein the exfoliated picture includes an exfoliated picture of image data rendered on the three-dimensional hypothetical surface by performing volume rendering.

15. The method of claim 1, wherein the exfoliated picture includes an exfoliated picture of image data rendered on the three-dimensional hypothetical surface by performing surface rendering.

16. A method for generating an exfoliated picture of image data of a subject rendered on a three-dimensional hypothetical surface from each of points continuously distributed on a hypothetical center line defined in the image data, wherein the image data includes a plurality of pixels, at least some of which form the exfoliated picture, the method comprising;
temporarily generating the exfoliated picture by unfolding the three-dimensional hypothetical surface;
setting a specific direction for the image data;
calculating physical direction information representing physical direction or position of the subject in the exfoliated picture of the at least some pixels for each of the points on the hypothetical center line based on the specific direction and the direction in which the hypothetical center line extends;
generating a new exfoliated picture by synthesizing the exfoliated picture and the physical direction information, wherein said generating the new exfoliated picture includes generating the new exfoliated picture so as to visualize the physical direction information of the subject in the new exfoliated picture; and
displaying to new exfoliated picture with the physical direction information with reference to gravity as indicated by a fluid path.

17. The method of claim 16, wherein the image data includes image data of an object the method further comprising:
setting a hypothetical surface, crossing the hypothetical center line, for defining a plurality of cross sections in the object; and
calculating additional information representing change in the area of the cross sections;
wherein said generating a new exfoliated picture includes generating the new exfoliated picture by synthesizing the exfoliated picture, the physical direction information, and the additional information.

18. A computer program product comprising a computer-readable medium encoded with a program for generating an exfoliated picture of image data of subject rendered on a three-dimensional hypothetical surface from each of points continuously distributed on a hypothetical center line defined in the image data, wherein the image data includes a plurality of pixels, each having position data, the program when executed by at least one computer performing steps including:

calculating physical direction information of of the subject for each of the points on the hypothetical center line using the position data of the pixels;
generating the exfoliated picture with the physical direction information, wherein said generating the exfoliated picture includes generating the exfoliated picture so as to visualize the physical direction information of the subject in the exfoliated picture; and
displaying the exfoliated picture with the physical direction information with reference to gravity as indicated by a fluid path.

19. The computer program product of claim 18, wherein the position data is coordinate data of a Cartesian coordinate system for each of the pixels.

20. The computer program product of claim 18, wherein the computer program when executed by the at least one computer further performs the step including:
extracting a region from the image data; and
wherein said generating the exfoliated picture includes generating the exfoliated picture with the physical direction information and information of the region that is extracted.

21. The computer program product of claim 18, wherein the image data includes image data of a tubular body.

22. The computer program product of claim 18, wherein the computer program when executed by the at least one computer further performs steps including:
calculating additional information related to the image data with the position data of the pixels; and
adding the additional information to the physical direction information.

23. The computer program product of claim 22, wherein the image data includes image data of a tubular body, the computer program when executed by the at least one computer further performing the step including:
defining a plurality of cross sections of the tubular body;
wherein said calculating additional information includes calculating additional information including at least one of change in area of each cross section of the tubular body, distance from a base position to each cross section of the tubular body, and a coordinate for each cross section of the tubular body.

24. The computer program product of claim 22, wherein said calculating physical direction information includes calculating physical direction information including at least one of change in inclination of each cross section of the tubular body and twisting of the tubular body.

25. The computer program product of claim 18, wherein said generating the exfoliated picture includes generating the exfoliated picture so as to express a band-like image of which width or position changes in accordance with the position data of the pixels.

26. The computer program product of claim 18, wherein said generating the exfoliated picture includes generating the exfoliated picture so as to express the physical direction information with a numerical value.

27. The computer program product of claim 18, wherein said generating the exfoliated picture includes generating the exfoliated picture so as to express at least one of the physical direction information and additional information relating to the image data with a color.

28. The computer program product of claim 18, wherein said generating the exfoliated picture includes generating the exfoliated picture so as to express at least one of the image information and additional information relating to the image data with at least one line.

29. The computer program product of claim 18, wherein said generating the exfoliated picture includes generating the exfoliated picture so as to express at least one of the physical direction information and additional information relating to the image data with transparency.

30. The computer program product of claim 18, wherein said generating the exfoliated picture includes generating the exfoliated picture so as to express at least one of the physical direction information and additional information relating to the image data with flashing animation.

31. The computer program product of claim 18, wherein the exfoliated picture includes an exfoliated picture of image data rendered on the three-dimensional hypothetical surface by performing volume rendering.

32. The computer program product of claim 18, wherein the exfoliated picture includes an exfoliated picture of image data rendered on the three-dimensional hypothetical surface by performing surface rendering.

33. A computer program product comprising a computer-readable medium encoded with a computer program for generating an exfoliated picture of image data of a subject rendered on a three-dimensional hypothetical surface from each of points continuously distributed on a hypothetical center line defined in the image data, wherein the image data include a plurality of pixels, at least some of which form the exfoliated picture, the program when executed by at least one computer performing steps including:
　　temporarily generating the exfoliated picture by unfolding the three-dimensional hypothetical surface;
　　setting a specific direction for the image data;
　　calculating physical direction information representing physical direction or position of the subject in the exfoliated picture of the at least some pixels for each of the points on the hypothetical center line based on the specific direction and the direction in which the hypothetical center line extends;
　　generating a new exfoliated picture by synthesizing the exfoliated picture and the physical direction information, wherein said generating the new exfoliated picture includes generating the new exfoliated picture so as to visualize the physical direction information of the subject in the new exfoliated picture; and
　　displaying the new exfoliated picture with the physical direction information with reference to gravity as indicated by a fluid path.

34. The computer program product of claim 33, wherein the image data includes image data of an object, the computer program when executed by the at least one computer further performing the steps including:
　　setting a hypothetical surface, crossing the hypothetical center line, for defining a plurality of cross sections in the object; and
　　calculating additional information representing a change in the area of the cross sections;
　　wherein said generating a new exfoliated picture includes generating the new exfoliated picture by synthesizing the exfoliated picture, the physical direction information, and the additional information.

35. A device for generating an-exfoliated picture image data of a subject rendered on a three-dimensional hypothetical surface from each of points continuously distributed on a hypothetical center line defined in the image data, wherein the image data includes a plurality of pixels, each having position data, the device comprising:
　　a direction information calculating means for calculating physical direction information of the subject for each of the points on the hypothetical center line using the position data of the pixels;
　　a generating means for generating the exfoliated picture with the physical direction information, wherein said generating the exfoliated picture includes generating the exfoliated picture so as to visualize the physical direction information of the subject in the exfoliated picture; and
　　displaying the exfoliated picture with the physical direction information.

36. The device of claim 35, wherein the position data is coordinate data of a Cartesian coordinate system for each of the pixels.

37. The device of claim 35, wherein the generating means generates the exfoliated picture with the physical direction information and information of a region extracted from the image data.

38. The device of claim 35, wherein at least one of the direction calculating means and the generating means is a central processing unit.

39. A device for generating an exfoliated picture of image data of a subject rendered on a three-dimensional hypothetical surface from each of points continuously distributed on a hypothetical center line defined in the image data, wherein the image data includes a plurality of pixels, each having position data, the device comprising:
　　a computer readable medium storing a computer program that when executed by the computer calculates physical direction information of the subject for each of the points on the hytotetical center line using the position data of the pixels and generates the exfoliated picture with the physical direction information, wherein said generating the exfoliated picture includes generating the exfoliated picture so as to visualize the physical direction information of the subject in the exfoliated picture; and displaying the exfoliated picture with the physical direction information.

* * * * *